United States Patent
Pailles et al.

(10) Patent No.: US 7,802,098 B2
(45) Date of Patent: Sep. 21, 2010

(54) CRYPTOGRAPHY METHOD AND SMART CARDS MICROCIRCUIT

(75) Inventors: Jean-Claude Pailles, Epron (FR); Marc Girault, Caen (FR)

(73) Assignee: France Telecom SA, Paris (FR)

( * ) Notice: Subject to any disclaimer, the term of this patent is extended or adjusted under 35 U.S.C. 154(b) by 959 days.

(21) Appl. No.: 10/296,915

(22) PCT Filed: May 30, 2001

(86) PCT No.: PCT/FR01/01684

§ 371 (c)(1),
(2), (4) Date: Mar. 20, 2003

(87) PCT Pub. No.: WO01/93216

PCT Pub. Date: Dec. 6, 2001

(65) Prior Publication Data

US 2003/0163699 A1 Aug. 28, 2003

(30) Foreign Application Priority Data

May 31, 2000 (FR) .................................. 00 07040

(51) Int. Cl.
*H04L 9/32* (2006.01)
*H04L 9/00* (2006.01)

(52) U.S. Cl. .................... 713/174; 713/168; 713/172; 708/606; 705/65

(58) Field of Classification Search ........... None
See application file for complete search history.

(56) References Cited

U.S. PATENT DOCUMENTS

| | | | | |
|---|---|---|---|---|
| 5,299,262 A | * | 3/1994 | Brickell et al. | 380/28 |
| 5,668,878 A | * | 9/1997 | Brands | 380/30 |
| 5,910,989 A | * | 6/1999 | Naccache | 713/173 |
| 5,999,627 A | * | 12/1999 | Lee et al. | 380/30 |
| 6,212,637 B1 | * | 4/2001 | Ohta et al. | 713/176 |
| 6,314,519 B1 | * | 11/2001 | Davis et al. | 726/4 |
| 6,463,537 B1 | * | 10/2002 | Tello | 713/182 |
| 6,668,326 B1 | * | 12/2003 | Sella et al. | 726/6 |
| 7,006,999 B1 | * | 2/2006 | Huberman et al. | 705/74 |
| 7,016,494 B2 | * | 3/2006 | Hopkins et al. | 380/44 |
| 2002/0057796 A1 | * | 5/2002 | Lambert et al. | 380/28 |

FOREIGN PATENT DOCUMENTS

| | | |
|---|---|---|
| FR | 2 716 058 | 8/1995 |
| WO | WO 99 01960 | 1/1999 |
| WO | WO 99/01960 | * 1/1999 |

OTHER PUBLICATIONS

Naccache et al, *Cryptographic Smart Cards*, IEEE Micro, U.S., vol. 16, No. 3, Jun. 1996, pp. 14-24.
*Digital Signature Algorithm (DSA)*, Chapter 20, "Public-Key Digital Signature Algorithms", pp. 483-502, John Wiley, 2nd Edition, 1996.

* cited by examiner

*Primary Examiner*—Syed A. Zia
(74) *Attorney, Agent, or Firm*—Patterson Thuente Christensen Pedersen, P.A.

(57) ABSTRACT

Method of cryptography in a smart card comprising a central processing unit, said method implementing precomputation operations, characterized in that said precomputation operations are performed by the smart card and in that the precomputation operations are carried out at a session during the waiting periods of the inputs/outputs of the central processing unit.

12 Claims, 5 Drawing Sheets

CRYPTOGRAPHY METHOD AND SMART CARDS MICROCIRCUIT

RELATED APPLICATIONS

The present application is a national stage entry of PCT Application No. PCT/FR2001/001684, filed May 30, 2001, which claims priority from French Application Number 00/07040, filed May 31, 2000, the disclosures of which are hereby incorporated by reference herein in their entirety.

FIELD OF THE INVENTION

The invention relates to a method of cryptography in a smart card comprising a central processing unit, the method implementing precomputation operations. The invention also relates to a microcircuit for smart cards capable of communicating with the exterior through an input-output interface, said microcircuit comprising means for the execution of tasks, including a computation task, and means to manage the execution of the tasks.

It can be applied to contact type smart cards or contactless smart cards as well as to combination cards, namely cards that can be used for operation with contact as well as contactless operation.

BACKGROUND OF THE INVENTION

A smart card C with a chip or chips comprises a microcircuit MC shown in FIG. 1, essentially comprising an input-output interface, a microprocessor UC, an operating program memory M1 for example a ROM (or "Read Only Memory"), an application(s) program memory M3 for example an EEPROM ("Electrically Erasable Programmable Read Only Memory"), a working memory M2, for example a RAM ("Random Access Memory").

In the case of contact-type smart cards, the input-output interface is formed by an asynchronous reception or transmission unit UART and a receiver CN generally comprising eight contact zones flush with the card.

In the case of contactless smart cards, this input/output interface is formed by the asynchronous unit UART and a radiofrequency transmitter-receiver device RF comprising an antenna.

In the case of combined-operation smart cards, this interface comprises, of course, the device RF and the contact zones CN.

The field of the invention is that of smart cards using the results of exponentiation computations referenced $g^x$ and often done as modulo n computations. These computations are executed in numerous applications based especially on the signing or authentication of messages.

The most practical and reliable authentication or signing schemes used at present are the public key algorithms. The best-known and most widely used of these is the RSA algorithm (named after its inventors R. Rivest, A. Shamir and L. Adleman), which is costly in computation time. The schemes based on the discrete algorithm too have been known for a long time and have the advantage of lending themselves to precomputation operations relating especially to the exponentiation computations which are very costly in time.

The invention can be applied to microcircuit cards implementing public key algorithms using the discrete logarithm in any mathematical structure, especially rings of numbers modulo n (where n belongs to the set Zn, the set of positive integers smaller than n), the elliptic curves on the finite fields GF(q) (GF(q) being the field for which the number of elements is q, with q as a prime number or the power of a prime number). The exponentiation $g^x$ covers all these structures.

Exemplary methods implementing such computations are presented in the patent application FR No. FR 2 716 058.

In the case of Zn and of the present embodiments requiring modular exponentiation type ($b^x$ modulo n) computations where the numbers b, x and n commonly have lengths ranging from 768 to 1024 bits, the performances are in the range of 500 to 300 ms. This performance can be achieved only with 8-bit microprocessors using "crypto-processors" capable of performing high-speed operations of multiplication and modulo n reduction or with 16-bit or 32-bit microprocessors whose intrinsic performance characteristics enable these performance levels to be achieved without resorting to a specific computation cell such as a crypto-processor.

These performance levels are not sufficient in certain cases. We shall now present an exemplary use of combination cards for public transport services.

When the card works in contactless mode, it must enable a terminal, during entry into an underground station or into a bus, to authenticate the ticket, verify an entitlement to a certain type of reduction and/or receive payment by electronic wallet (PME). For this type of transaction, as in general for PME type transactions, the public key cryptography algorithms are used for purposes of key management, compliance with standards and, ultimately, security.

This type of transaction must take place within 150 ms. This is the time needed for a user to pass the card, in a natural movement, before a terminal integrated into a turnstile or located at the entrance to a bus. These 150 ms must then cover not only the cryptographic computations but also the inputs/outputs of the messages and the processing operations other than cryptographic processing operations, whether they are done on the terminal side or on the card side. The processing operations on the terminal side and card side cannot take place in parallel because they are sequenced in a precise order established by a predefined protocol. In practice, given the computation time required on the terminal side, the cryptographic computations on the card side must therefore take place in less than 30 ms.

There is no microcircuit card component today that enables such performance levels to be achieved. Furthermore, since the card, in contactless mode, is powered by the energy radiated by the terminal and recovered at the antenna, the consumable power is limited and therefore the computation capacities are limited too.

In contact mode, these constraints are not as acute. For example, in payment by electronic purse or wallet, the customer does not need to be made to wait at the sales point for more than a few seconds. However, certain operations demand that the transactions should remain short, in the range of one second.

To know the details of the computations performed by a public key cryptography algorithm, reference may be made to the patent application FR No. 2 716 058 which presents a method for the digital signing and authentication of messages using a discrete logarithm.

The method as described in the above patent may be summarized as follows.

The signing method is preceded by a preliminary phase shown in FIG. 2a.

An authority A, for example a bank or a transport organization, holding a public key $P_A$ and a secret signing key $S_A$, chooses a number n (a prime number or composite of prime numbers) and g (an integer smaller than n and generally far smaller) as well as a hashing function h and sends $P_A$, n, g and h to the entity S which must sign a message, this entity being for example a smart card that has to validate an amount to be paid, as well as to the entities V which must verify the signing, these entities being, for example, terminals such as the ones presently used by tradesmen with their customers.

The entity S chooses a secret key x, computes its public key $y=g^{-x}$ mod n, sends it to the authority A which sends back a certificate Cert to it. This certificate is itself set up especially on the basis of its secret signing key $S_A$.

The pieces of data n, g, x, y, Cert are permanent data of the entity S.

With this preliminary phase completed, the method for signing a message M can start. For S, as shown in FIG. 2b, this may entail the signing of an amount to be paid proposed by V; the message M contains especially the amount to be paid m and an identification of the terminal V requesting this payment.

The following are the steps of this signing method:
a) S randomly chooses k,
b) a witness element $r=g^k$ mod n is computed
c) a known hashing function h of A, S and V is used to compute c=h(r,M)
d) finally s=k+cx is computed
e) S sends V this information: y, Cert, M, c, S V verifies Cert with $P_A$, computes $u=y^c g^s$ mod n and verifies that c=h(u,M). If the verification is right, the signing of M is authenticated.

One of the steps of this method consists of the computation, at each transaction, of a witness r requiring an exponentiation ($r=g^k$ mod n for example). This operation uses a great deal of time; this is why it is sometimes planned to precompute these witness elements. However, these precomputations are done by an external device and then the pairs (k,r) are written in a storage zone of the card, for example M3, and this has drawbacks.

Indeed, the knowledge of the data needed to compute these witness elements and knowledge of the witness elements themselves makes it possible to recover the secret cryptography key. Indeed, the knowledge of r and k gives c=h(r,M); the knowledge of s=k+cx and k and c and gives x. The secret is therefore shared between the entity supposed to hold it and this external device in which therefore a great deal of trust has to be placed.

It is also necessary to be assured of the total security of the sending of the pairs (k,r) to the card and of their writing.

Furthermore, if the card no longer contains pairs (k,r), it must be reloaded with them. This requires a special terminal connected to a network.

SUMMARY OF THE INVENTION

The aim of the invention is to avoid these drawbacks by seeing to it that the pairs (k,r) are computed by the card without any adverse effects on the duration of the transactions.

This is obtained by basing the invention on the fact that, in a smart card microprocessor (or computer in general), a major proportion of the time is devoted to waiting for external events to take place. During such times or waiting periods, namely when the card is waiting for a new control message from the terminal or else when the card is in a phase of reception or transmission of a lengthy message on its input/output port, the microprocessor can compute the witness elements r if the zone of storage of the pairs (k,r) is not full.

These waiting times shall be highlighted in the case shown in FIG. 3 for the recharging of a combined card type of electronic purse card (PME) linked through a telecommunications or computer network R to the reloading server of a financial organization F. This device C may be a Minitel terminal or computer or again a two-slot portable telephone, of a kind already in existence, capable of receiving another card such as a card PME in addition to the usual SIM ("Subscriber Identity Module") card.

After the card PME has been introduced into the device P, with the card then working in contact mode, the device P requests the card PME to authenticate itself. The signature of PME is transmitted by P to F, along with the amount to be loaded into the card PME. Starting from the onset of this transmission, the card PME inserted into the device P is in a waiting state.

The transmission to the server of F through the network last about 5 to 10 seconds. The authentication by the server of F of the signature of PME and the signing by F of the amount to be reloaded may last about two seconds. Similarly, the transmission from F to P, through the network R, of the signed reloading message may again take 5 to 10 seconds. The waiting time of the card will have been about 15 seconds.

After reception by P and then by the card PME of the reloading message, the latter verifies the signature of F. Then, if the authentication is successful, the PME card updates its credit.

In this example, the card thus has sufficient waiting time to perform precomputations.

An object of the invention is a method of cryptography in a smart card, the card comprising a central processing unit, said method implementing precomputations, chiefly characterized in that said precomputations are performed by the smart card and in that the precomputations are performed at a session during the input-output waiting periods of the central processing unit.

This method may, as the case may be, implement an algorithm based on the computation of a discrete logarithm.

According to one characteristic, the precomputations therefore comprise computations of exponentiation.

The precomputations are advantageously performed in steps by carrying out intermediate computations, the results of these intermediate computations being stored in the smart card.

An object of the invention is also a microcircuit for a smart card capable of communicating with the exterior through an input-output interface I, comprising task-execution means ET including a computation task PC and means GE for the management of the execution of the tasks, characterized in that the management means GE comprise means APC for the activation of the computation task PC during the waiting times pertaining to the other task or tasks active on the microcircuit.

According to one characteristic of the invention, the task execution means ET comprise a microprocessor UC, a program memory M1 comprising the task execution management program and an applications program memory M3 comprising the executable task or tasks in the form of one or more application programs.

The task execution means ET may furthermore comprise a cryptographic computation circuit CP.

According to another characteristic of the invention, the task execution means ET are capable of carrying out computations of exponentiation.

According to one embodiment of the invention, the computation task activation means APC comprise a circuit O for the scheduling of the inputs-outputs of/on the card capable of activating the task execution means ET when said scheduling circuit O awaits an input or an output.

The microcircuit preferably comprises means M3 to store the results of said computations.

An object of the invention is also a contactless and/or contact type microcircuit card comprising a microcircuit as described here above.

BRIEF DESCRIPTION OF THE DRAWINGS

Other features and advantages of the invention shall appear more clearly from the following description given by way of a non-restrictive example and from the appended drawings, of which.

DETAILED DESCRIPTION OF THE DRAWINGS

Figure 1:
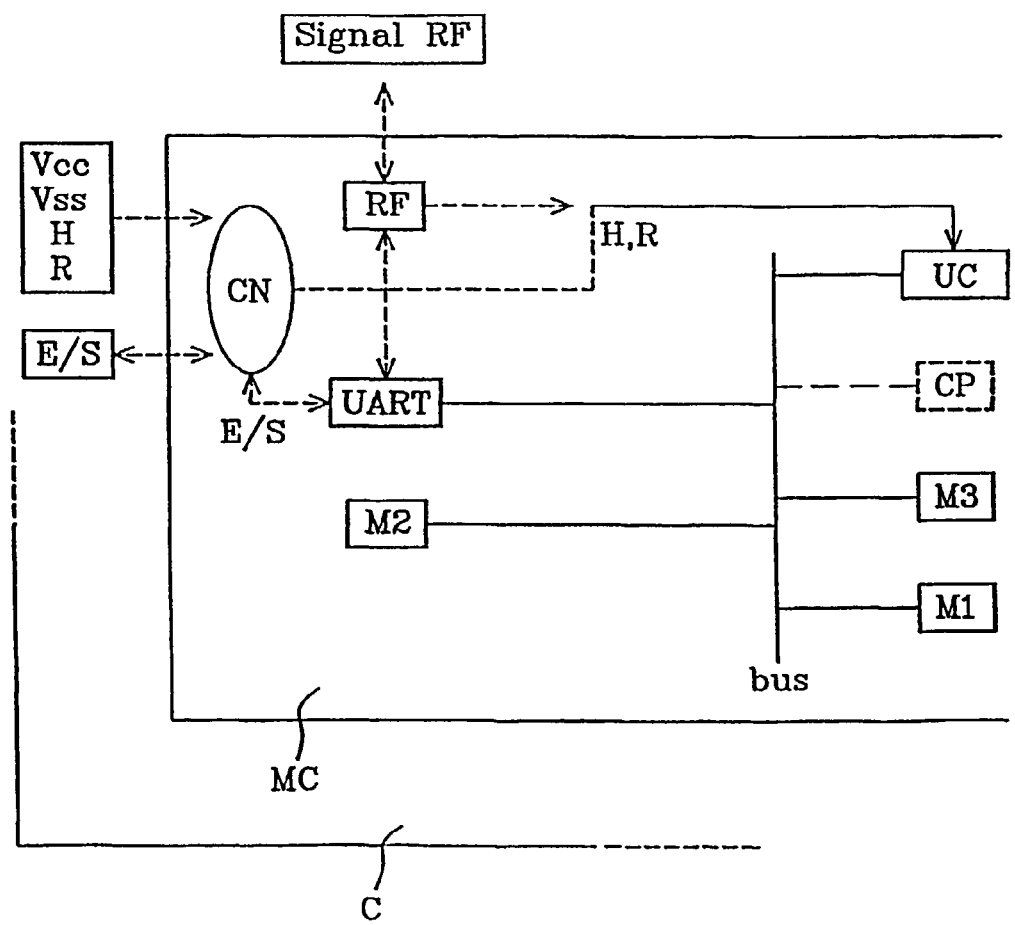
FIG. 1 is a schematic view of a smart-card microcircuit.
Figure 2A:
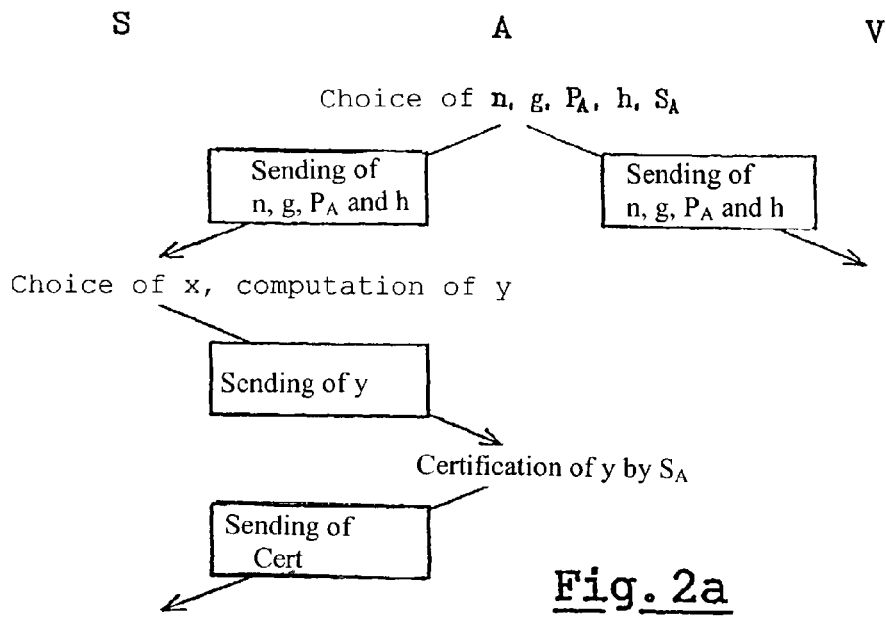
FIG. 2a provides a schematic view of the progress of the preliminary certification phase, necessary before the use of a signing method, FIG. 2b gives a schematic view of the signing phase of a signing method, FIG. 3 gives a schematic view of the progress of an electronic wallet reloading transaction.
Figure 2B:
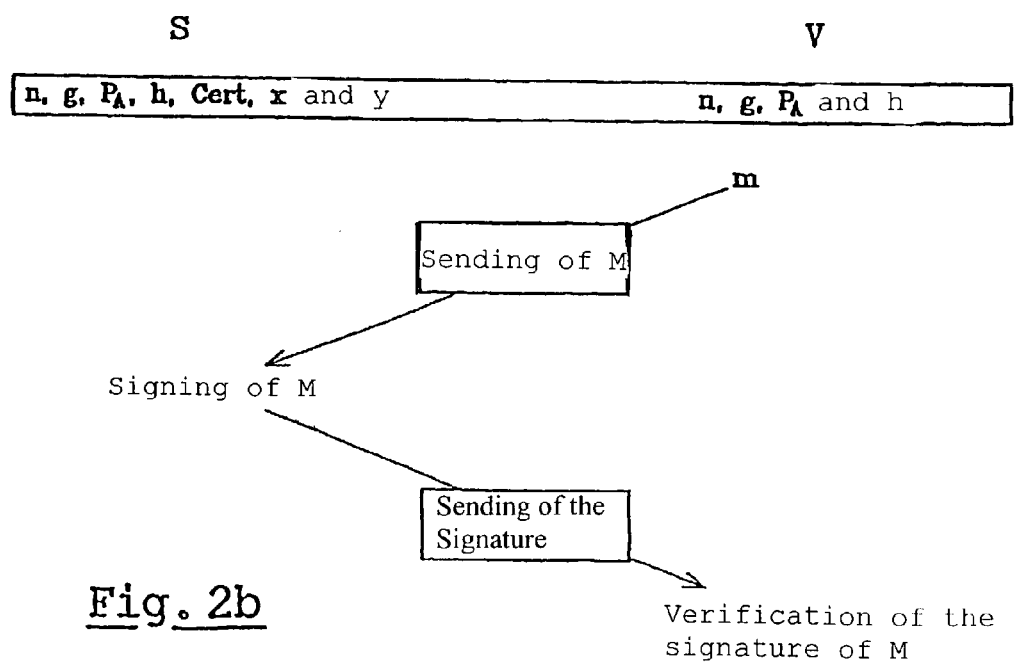
Figure 3:
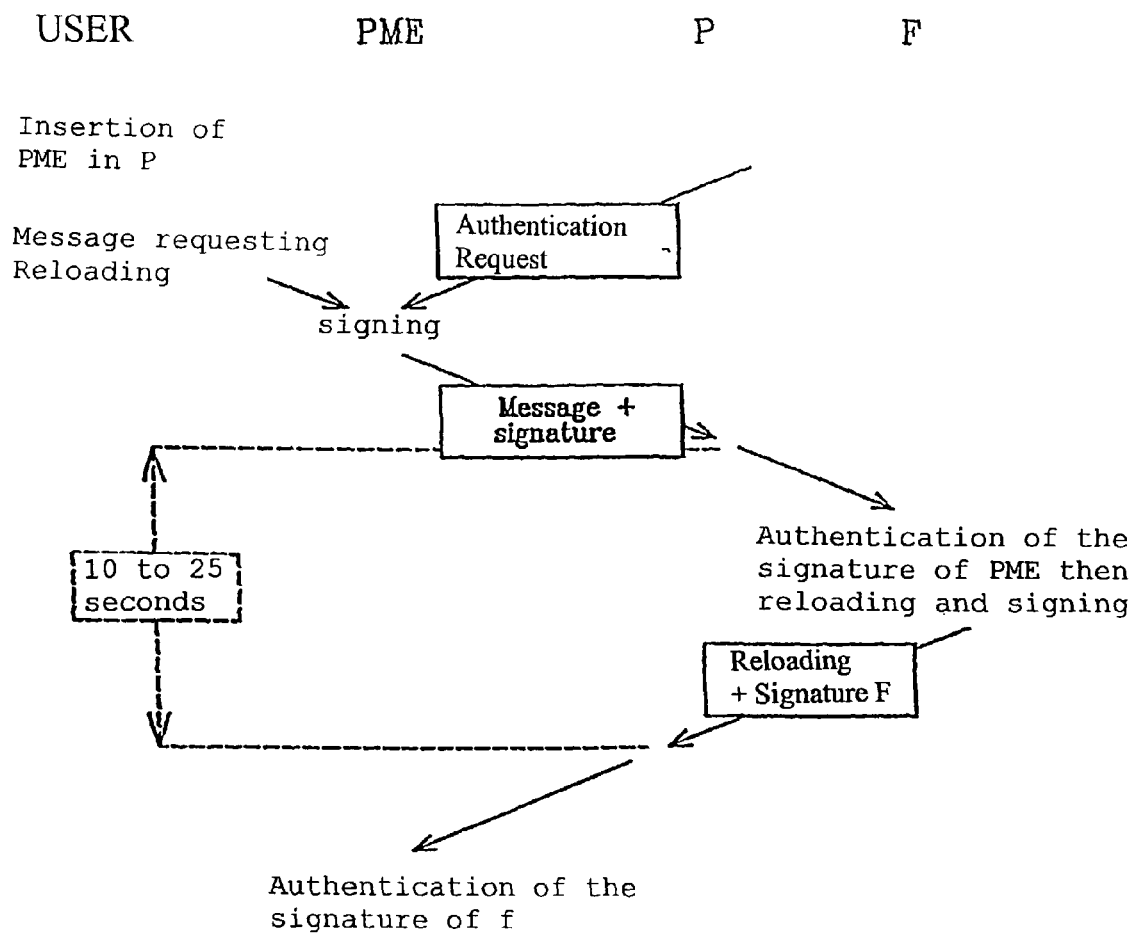

The microcircuits of the smart card(s) such as those considered in the invention are constituted by different elements connected together by a bus, the most important of these elements being shown in FIG. 1.

The central processing unit UC or microprocessor executes the instructions of the programs stored in a ROM type non-volatile memory M1. This central processing unit UC conventionally receives the clock signals H and Reset signals R through an interface I. When the card works in contact mode, the signals H and R come from the contacts whereas, when the card works in contactless mode, these signals are given by the RF signal received through a radiofrequency device RF This central processing signal UC is sometimes seconded by a crypto-processor CP specialized in the fast processing of modulo n operations of exponentiation.

The memory M1 contains task execution management means GE which, in certain cases, are included in the COS ("Chip or Card Operating System". The function of the COS is to manage the inputs-outputs, organize and manage the memory, manage access authorizations (confidential codes), organize the response to the Reset signal, carry out the loading if necessary of specific sub-programs during the customization of the card or during the use of the card. The memory M1 also sometimes contains the programs of the applications.

The programs of the memory M1 use RAM type working memories M2 or registers and EEPROM type permanent memories M3 for the permanent data which must not be erased even if the circuit is no longer powered. The application programs are often stored in these memories M3.

The microcircuit communicates with the exterior by means of an asynchronous reception or transmission unit UART responsible for receiving or transmitting messages in the form of blocks of several bytes. This asynchronous unit UART itself communicates with the input/output series link ES through an interface I. In the case of contact type cards, the messages pass through the contact zones and, in the case of the contactless cards, the messages pass through the radiofrequency device RF.

The microcircuit is supplied with energy by the interface I which is itself supplied with the supply voltage referenced Vcc (Vcc=5 Volts) and by the electric ground referenced Vss (Vss=0 Volt). In contact type mode, the interface I is powered through the contacts while, in contactless mode, it is powered by the radiofrequency signal through the radiofrequency device RF.

According to the invention, in the operating system COS stored in the memory M1, there are provided means GE for the management of the tasks execution ET of the different tasks constituting the applications. These tasks include the computation task PC: it will be activated by the management means GE during the waiting time corresponding to the other tasks which will thus be put to good use to perform the precomputations and save them in the memory M3.

To this end, the management means GE comprise means APC for the activation of the precomputation tasks PC. These activation means APC may consist of a program or may be integrated into a scheduling circuit O.

Figure 4:
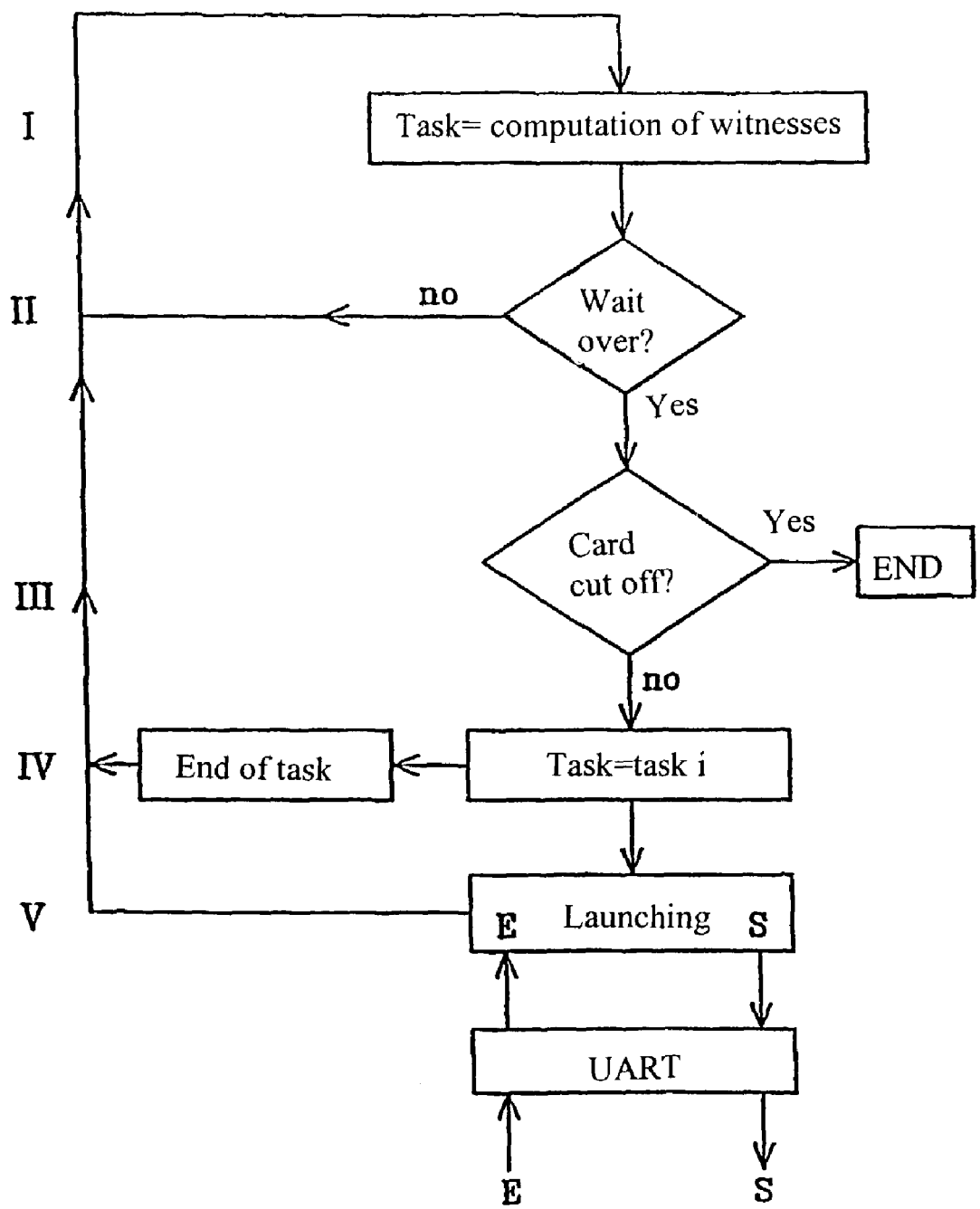
FIG. 4 is a flow chart showing the working of the activation means APC.

A description shall now be given of the working of these activation means APC shown in FIG. 4 while the "computation of witness elements" task is active, namely when a computation of witness elements is in progress, step I.

When there is an external event, namely when the waiting times used by the "computation of witness elements" task to execute its computations are over (step II), and if the supply to the card is not cut off (step III), the means APC pass on to whichever task is entitled to be performed:

if the external event corresponds to the reception of a new N-byte message by the UART the means APC then pass on to the task that was awaiting this message, for example the task t1 (step IV), if the external event corresponds to the end of transmission, by the UART, of a message comprising N' bytes, the means APC then pass on to the task in which this message had been sent out, for example the task t2 (step IV).

Then when the task ti (t1 or t2 in the present example) to which the means APC had returned is completed or when an external event takes place (step 5) prompting a wait, the means APC return to the "computation of witness elements" task during this waiting period until this "computation of witness elements" task is completed (the witness elements storage zone is full) or when an external event occurs (step V) and there is then a return to the initial situation.

It may be considered that the APC means manage the priorities between the tasks, the applications tasks always having priority over the "computation of witness elements" tasks.

The computation of witness elements may be lengthy: several hundreds of ms. To the extent that this computation may be interrupted by the other tasks which are priority tasks or by a power cut, this computation is done in steps, the intermediate results being saved in the storage zone, in this case the memory M3. Thus, a computation that is started but not completed will not be lost and could be resumed without any need to redo the entire computation which has already been performed, when the APC means return to this "witness element computation" task. If the task is interrupted during the step m, the results of the step m-1 having been saved, the computations will resume at the start of the step m when the means APC again return to the task.

A step is itself formed by elementary loops and a loop counter used to activate the saving if a predetermined number of loops has been counted. To give a clear picture, if k amounts to 300 bits, the computation can be organized in 10 steps of 30 loops each.

Figure 5:
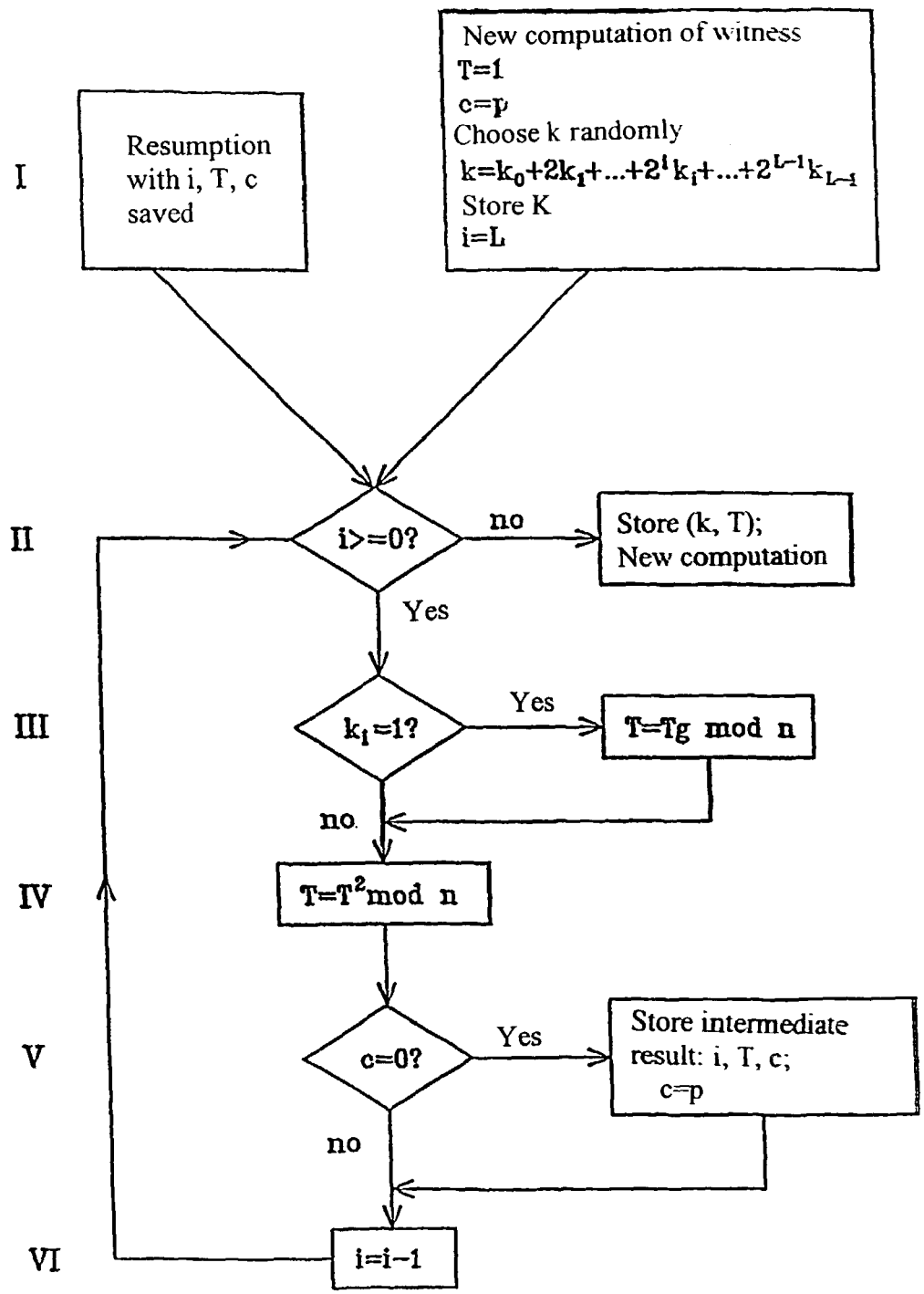
FIG. 5 is the flow chart of an exemplary precomputation according to the invention.

One example for which the flow chart is shown in FIG. 5 illustrates this process in which the witness element r is computed according to the formula $r = g^k \bmod n$ A preliminary step I precedes the computation itself: this step consists in choosing k and initializing the parameters that will be used thereafter with the values of the saved parameters or with default values. The computation is done in a loop comprising the steps II to VI, consisting of comparisons, computations and saving or storage operations.

These computations of witness elements by the card during the waiting periods makes it possible, during a transaction, to replace the steps a and b) ("choose k and cancel r") of the signing method initially described by "read a pair (k,r) in the storage zone", this storage zone having been filled according to the method equivalent to that indicated here above. The other computations remaining to be executed by the card are simple and fast computations. The cryptographic computations on the card side then occur in less than about 10 ms and thus enable the required performance levels to be easily achieved.

It is furthermore possible to achieve savings in memory space.

Indeed, if k is generated by a reproducible pseudo-random generator, then k does not have to be saved: only the input parameters of the generator can be saved. This represents a saving of memory space.

Similarly, it is not necessary to store the pair (k,r) in its totality: it is enough to limit the storage to a small number of bits of $g^k$ mod n. An example is given in the patent No. FR 2 752 122.

The invention claimed is:

1. A method of using cryptography for smart cards comprising:
   introducing into communication with a terminal, a smart card to perform a current transaction, the smart card comprising a central processing unit and being adapted to communicate with the terminal through an input-output interface;
   entering, by the smart card, into a waiting period wherein there is no active task related to an input-output event to be performed by the smart card for the current transaction; and
   performing, by the smart card, at least one cryptographic precomputation associated with a future transaction to be performed by the smart card, the future transaction being independent from the current transaction, the at least one cryptographic precomputation comprising a plurality of intermediate computations including at least partial calculation of one or more witness elements, wherein a result of each intermediate computation is stored in the smart card in a storage zone of the card,
   wherein the at least one cryptographic precomputation is performed by the smart card during the waiting period, and wherein one or more active tasks related to the current transaction have priority over the at least one cryptographic precomputation such that input-output events related to the one or more active tasks interrupt the at least one cryptographic precomputation thereby ending the waiting period.

2. The method of claim 1, wherein the at least one cryptographic precomputation comprises an algorithm based on a computation of a discrete logarithm.

3. The method of claim 1, wherein the at least one cryptographic precomputation comprises a computation of exponentiation.

4. A microcircuit for a smart card adapted to communicate with an exterior terminal to perform a transaction through an input-output interface, the microcircuit comprising:
   a task-execution system configured to execute
   at least one executable cryptographic precomputation task associated with a future transaction to be performed by the smart card, the future transaction being independent from a current transaction, the at least one cryptographic precomputation task comprising a plurality of intermediate computations including at least partial calculation of one or more witness elements, wherein a result of each intermediate computation is stored in the smart card, and
   a management program adapted to manage execution of the at least one cryptographic precomputation task, wherein the management program is adapted to cause the task-execution system to activate the at least one executable cryptographic precomputation task during a waiting period of the smart card wherein there is no active task related to an input-output event to be performed by the smart card for the current transaction,
   wherein one or more active tasks related to the current transaction have priority over the at least one cryptographic precomputation such that input-output events related to the one or more active tasks interrupt the at least one cryptographic precomputation thereby ending the waiting period.

5. The microcircuit according to claim 4, wherein the task-execution system comprises a microprocessor, a program memory comprising the management program, and an applications program memory comprising the at least one executable cryptographic computation task in the form of at least one application program.

6. The microcircuit according to claim 4, wherein the task-execution system further comprises a cryptographic computation circuit.

7. The microcircuit according to claim 4, wherein the task-execution system is adapted to carry out computations of exponentiation.

8. The microcircuit according to claim 4, further comprising means for the storage of results of the computations.

9. A contactless microcircuit card comprising the microcircuit according to claim 4.

10. A contact-type microcircuit card comprising the microcircuit according to claim 4.

11. A microcircuit card working in one of either a contactless mode or a contact mode, the microcircuit card comprising the microcircuit according to claim 4.

12. A microcircuit for a smart card adapted to communicate with an exterior terminal to perform a transaction through an input-output interface, the microcircuit comprising:
   a task-execution means including
   one or more active tasks associated with a current transaction,
   at least one executable cryptographic precomputation task associated with a future transaction to be performed by the smart card, the future transaction being independent from the current transaction, the at least one cryptographic precomputation task including at least partial calculation of one or more witness elements, and
   means for managing the execution of the at least one cryptographic precomputation task, wherein the management means comprises a task activation means for activating the at least one executable cryptographic precomputation task during a waiting period of the smart card wherein there is no active task related to an input-output event to be performed by the smart card for the current transaction, wherein the task-activation means comprises a circuit for the scheduling of inputs-outputs of the smart card adapted to activate the at least one executable cryptographic computation task when the scheduling circuit is awaiting an input or an output, wherein one or more active tasks related to the current transaction have priority over the at least one cryptographic precomputation such that input-output events related to the one or more active tasks interrupt the at least one cryptographic precomputation thereby ending the waiting period.

\* \* \* \* \*